United States Patent
Nguyen et al.

(10) Patent No.: US 8,521,810 B1
(45) Date of Patent: Aug. 27, 2013

(54) METHOD AND SYSTEM FOR CONTROLLING A DISPLAY BUFFER IN A CONTENT DISTRIBUTION SYSTEM

(75) Inventors: Diem V. Nguyen, Anaheim, CA (US); Titus Winters, New York, NY (US); Michel Dalal, Lakeville, MN (US); Jonathan Kochel, Chaska, MN (US); Walter F. Filbrich, Jr., Manhattan Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 177 days.

(21) Appl. No.: 12/881,027

(22) Filed: Sep. 13, 2010

Related U.S. Application Data

(60) Provisional application No. 61/242,341, filed on Sep. 14, 2009.

(51) Int. Cl.
*G06F 15/16* (2006.01)

(52) U.S. Cl.
USPC ............................................. 709/203

(58) Field of Classification Search
USPC ................. 709/203, 208; 725/63, 86, 151
See application file for complete search history.

(56) References Cited

U.S. PATENT DOCUMENTS

| | | | | |
|---|---|---|---|---|
| 5,265,250 A * | 11/1993 | Andrade et al. | ............... | 718/101 |
| 5,844,569 A * | 12/1998 | Eisler et al. | ................... | 345/619 |
| 6,014,765 A * | 1/2000 | Maeda et al. | ................ | 714/748 |
| 6,505,255 B1 * | 1/2003 | Akatsu et al. | ................ | 709/239 |
| 6,672,963 B1 * | 1/2004 | Link | .............................. | 463/43 |
| 6,828,993 B1 * | 12/2004 | Hendricks et al. | ........... | 715/819 |
| 8,145,777 B2 * | 3/2012 | Ryman et al. | ................ | 709/231 |
| 2002/0180757 A1 * | 12/2002 | Duerr et al. | .................... | 345/620 |
| 2005/0246752 A1 * | 11/2005 | Liwerant et al. | .............. | 725/109 |
| 2009/0027500 A1 * | 1/2009 | Elangovan et al. | .......... | 348/159 |
| 2009/0150465 A1 * | 6/2009 | Branda et al. | ................ | 707/206 |

OTHER PUBLICATIONS http://web.archive.org/web/20010509192614/http://java.sun.com/docs/books/tutorial/extra/fullscreen/doublebuf.html Sun, Double Buffering and Page Flipping, May 9 2001.*
http://web.archive.org/web/20021222003620/http://www.javacooperation.gmxhome.de/BildschirmflackernEng.html Fabian Birzele, Double buffering, Dec. 22 2002.*
Swing, Matthew Robinson, Pavel A. Vorobiev, Dec. 1, 1999, Ch. 2.11, pp. 45-50.*

* cited by examiner

*Primary Examiner* — Lance L Barry

(57) ABSTRACT

A system and method for displaying graphics in a content distribution system includes a client device and a server device that communicates an allocate buffer command signal to the client device. The client device reserves an off-screen buffer having buffer identifier associated therewith and communicates a buffer response signal comprising the buffer identifier to the server device. The server device communicates a write command signal comprising graphics data and the buffer identifier to the client device. The client device stores the graphics data in an off-screen buffer in response to write command signal, transfers the graphics data from the off-screen buffer to an on-screen buffer and displays graphics corresponding to the graphics data on a display associated with the client device. A bit blit command may be used to transfer the graphics data from the off-screen buffer to the on-screen buffer.

24 Claims, 8 Drawing Sheets

METHOD AND SYSTEM FOR CONTROLLING A DISPLAY BUFFER IN A CONTENT DISTRIBUTION SYSTEM

CROSS-REFERENCE TO RELATED APPLICATIONS

This application claims the benefit of U.S. Provisional Application No. 61/242,341, filed on Sep. 14, 2009. The entire disclosure of the above application is incorporated herein by reference.

TECHNICAL FIELD

The present disclosure relates generally communicating between a server device and a client device, and, more specifically, to controlling a buffer associated with a display of the client device.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as storage for the operating code of the set top box. Because of the numerous components associated with the set top box, the set top box for each individual television is relatively expensive.

Satellite television systems typically broadcast content to a number of users simultaneously in a system. Satellite television systems also offer subscription or pay-per-view access to broadcast content. Access is provided using signals broadcast over the satellite. Once access is provided, the user can access the particular content.

In a satellite television system, minimizing delay between the reception of signals and the display of signals on a display associated with the set top box is desirable to provide a satisfactory customer experience. Likewise, minimizing display of graphics such as a program guide, a screen saver or background is also desirable.

SUMMARY

The present disclosure controls the allocation of a buffer using an off-screen buffer and an on-screen buffer to display a graphics display associated with a client device. By providing the off-screen buffer, the number of times data is transmitted from the server to the client is minimized.

In one aspect of the disclosure, a method includes communicating an allocate buffer command signal to a client device from a server device, reserving an off-screen buffer having buffer identifier associate therewith, communicating a buffer response signal comprising the buffer identifier from the client device to the server device, generating a write command signal at the server device comprising graphics data and the buffer identifier, communicating the write command signal to the client device, storing the graphics data in an off-screen buffer, transferring the graphics data to the on-screen buffer from the off-screen buffer and displaying graphics corresponding to the graphics data on a display associated with the client device.

In a further aspect of the disclosure, a system for controlling includes a client device and a server device that communicates an allocate buffer command signal to the client device. The client device reserves an off-screen buffer having buffer identifier associated therewith and communicates a buffer response signal comprising the buffer identifier to the server device. The server device communicates a write command signal comprising graphics data and the buffer identifier to the client device. The client device stores the graphics data in an off-screen buffer in response to write command signal, transfers the graphics data from the off-screen buffer to an on-screen buffer and displays graphics corresponding to the graphics data on a display associated with the client device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
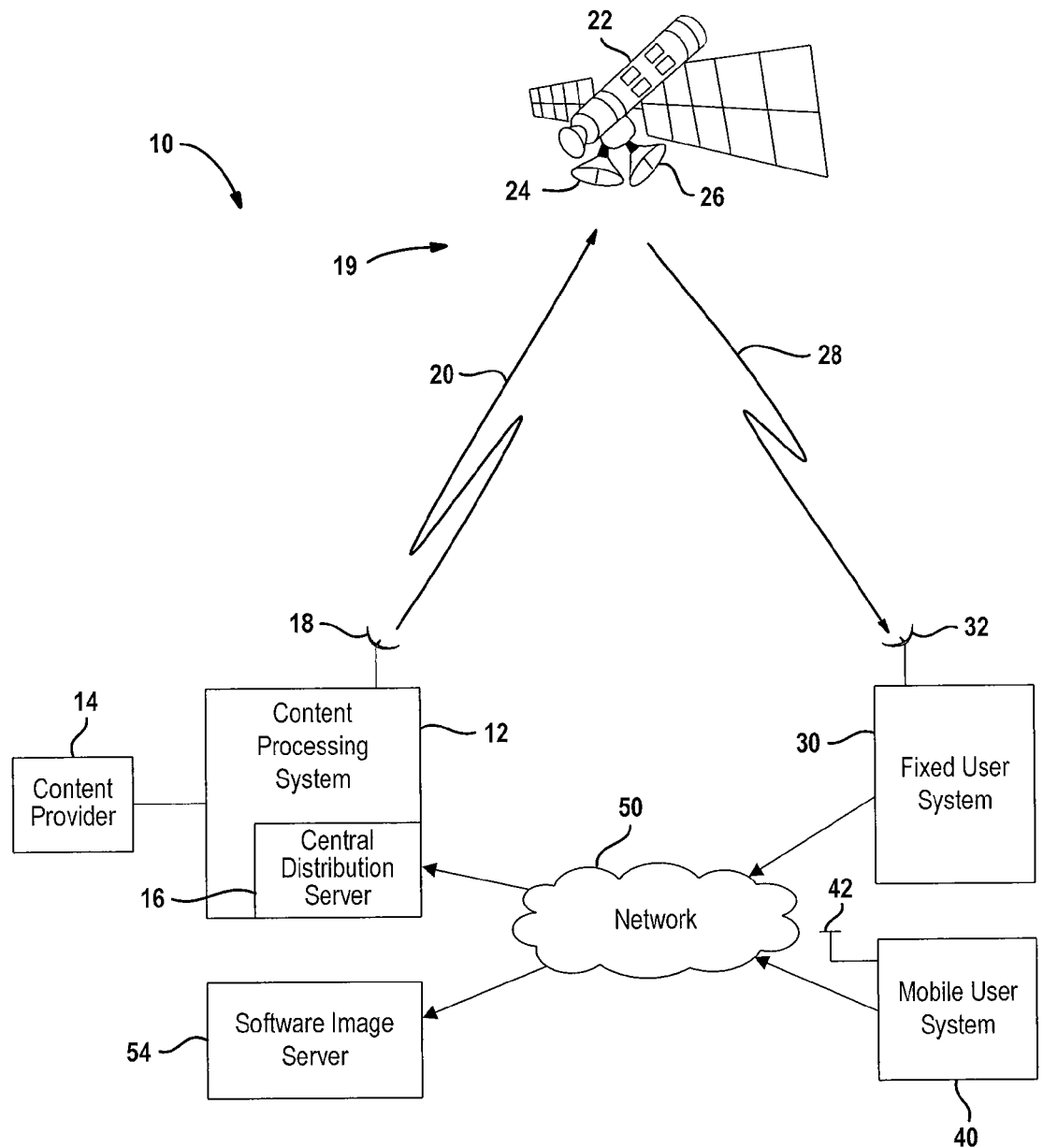
FIG. 1 is a high level block diagrammatic view of a satellite distribution system.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system. The communication system may be implemented in a terrestrial system such as a broadband system, cable system or telephone-type system. Optical fiber and wireless distribution may also be used in the broadband distribution system.

Further, many other types of content delivery systems are readily applicable to the disclosed systems and methods. For example, other wireless distribution systems, wired or cable distribution systems, cable television distribution systems, ultra-high frequency/very high frequency radio frequency systems, or other terrestrial broadcast systems may be used. Local multi-point distribution systems, Internet protocol- (IP) based distribution systems, cellular distribution systems, power-line broadcast systems, and point-to-point or multicast Internet protocol delivery networks may be used.

The following disclosure is made with respect to the delivery of video such as television, movies, music videos, and the like. It should also be understood that the systems and methods disclosed herein could also be used for the delivery of any media type, for example, audio, music, data, files, web pages, games, etc. Additionally, throughout this disclosure reference is made to data, information, program, movies, assets, video data, etc. However, it will be readily apparent that these terms are substantially equivalent in reference to the example systems and methods disclosed herein. Therefore, the present disclosure is applicable to the many types of content described above.

Referring now to FIG. 1, a communication system 10 is illustrated. Communication system 10 includes a content processing system 12 that is used as a processing and transmission source. A plurality of content providers 14, only one of which is illustrated, may provide content to the content processing system 12. The content processing system 12 receives various types of content from a content provider 14 and communicates the content to system users. The content processing system 12 may also be associated with a central distribution server 16. The central distribution server 16 may be incorporated into the content processing system 12 or may be a separate item. The central distribution server 16 may be used for various types of distribution including resetting a user device, providing a software image or providing an updated software image to a user device. Other uses of the central distribution server 16 will be described below.

The content processing system 12 communicates with various user systems through a content delivery system 19. The content delivery system 19 may be one of the various types of systems such as a wired, wireless, Internet Protocols, cable, high frequency system, etc. described above. In this case, a satellite system is illustrated but should not be considered limiting.

Carrying through with the satellite example, the content processing system 12 includes an antenna 18 for communicating processed content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlinks 28 and communicates the downlinks 28 to various user devices.

A fixed user system 30 receives the downlink signals 28 through a receiving antenna 32. The fixed user system 30 is a fixed user system meaning it is stationary. However, some components may be mobile components. The fixed user system 30 may be deployed within a building such as a single-family household, a multi-dwelling unit, or a business. Details of the fixed user system are provided below.

The present disclosure is also applicable to a mobile user system 40. The mobile user system 40 may include a satellite antenna 42. The satellite antenna 42 may be a tracking antenna to account for the mobility of the mobile user system. This is in contrast to the antenna 32 of the fixed user system that may be fixed in a single direction. The mobile user system 40 may include systems in airplanes, trains, buses, ships, and the like.

The fixed user system 30 and the mobile user system 40 may be in communication with a network 50. The network 50 may be a single network or a combination of different networks or different types of networks. The network 50 may, for example, be a broadband wired network or wireless network. The network 50 may be a one-way network so that data or content may be communicated from the fixed user system 30 or the mobile user system 40 through the network 50 to the content processing system 12 and the central distribution server 16. Likewise, the network 50 may also be one-way in the other direction so that the content distribution server 16 may communicate content data or other control signals such as a reset signal through the network 50 to the fixed user system 30 and the mobile user system 40. The network 50 may also be a two-way network so that communications may take place between the content processing system 12, which includes the distribution server 16, and the fixed user system 30 and the mobile user system 40. The network 50 may also be in communication with the software image server 54. The software image server 54 may include memory for storing software images for the fixed user system 30 or the mobile user system 40. The software image server 54 may include boot software images or other software images. The software images may be initial software images or revised software images. The software images within the software image server 54 may also be different versions of software images. The fixed user system 30 and the mobile user system 40 use various data versions of software for testing. The software image server 54 may be incorporated into the content processing system 12 or a separate component or data site that may interconnect to the other parts of the system 10 through the network 50.

Figure 2:
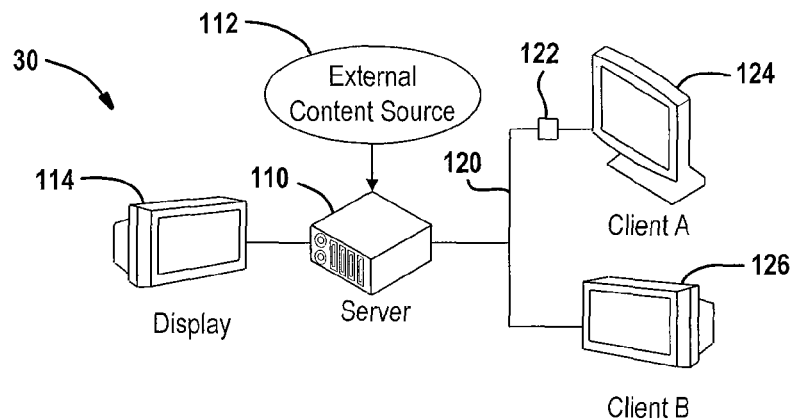
FIG. 2 is a block diagrammatic view of a first network topology.

Referring now to FIG. 2, an example of a fixed user system 30 is illustrated in further detail. The fixed user system 30 may include a local network server 110. The local network server 110 may receive content from an external source 112. The external source 112 may be a satellite distribution system as illustrated in FIG. 1 or the other sources described above. In such a case, the external source 112 may be the satellite antenna 32 illustrated in FIG. 1. The external source 112 may be a variety of television signal sources such as an over-the-air tuner, a cable, a wireless system, or an optical system. Various types of signals such as data, music, video, games, audio, and combinations thereof may be part of the external source.

The server device 110 may act as a set top box for directly communicating content to a display 114. The content in a direct connect may not be renderable content but rather directly displayable signals within a frequency band. The signals to display 114 may also be renderable. The display 114 may be a television or monitor.

The server device 110 may also be in communication with a local area network 120. Although wired connections are illustrated, wireless or optical signals may be used for communicating through the local area network 120. The server device 110 may also communicate with the network 50 illustrated in FIG. 1. In that case, the network 50 is an external network when compared to local area network 120. The local area network of FIG. 2 is formed through the server device 110. That is, the server device 110 acts to communicate to both clients A and B as well as acts as an intermediary if client A communicates with Client B, or vice versa.

The server device 110 may communicate with a first client, Client A, using a client device 122. The server device 110 may stream content signals to the client device 122. The server device 110 may also control the display of content and screen displays or remote user interfaces at the client device. The remote user interface may be a graphical user interface for controlling various selections or controls. The client device 122 may perform various functions that will be described below. For example, the client device 122 may render renderable signals from the server for displaying the rendered signals on a display 124 associated with the client device 122. The client device 122 may also select the content and controls from the user interface and communicate the control signals to the server device 110.

A second client, Client B, may also be in communication with the server 110 through the local area network 120. Client B may contain an internal client device, not shown, for displaying rendered signals on the display 126. The internal client device may be functionally equivalent to the standalone client device 122. Because both the first client, Client A, and the second client, Client B, are in communication directly with the server 110, the network may be referred to as a closed network. Various numbers of clients may be connected to the local area network 120.

Figure 3:
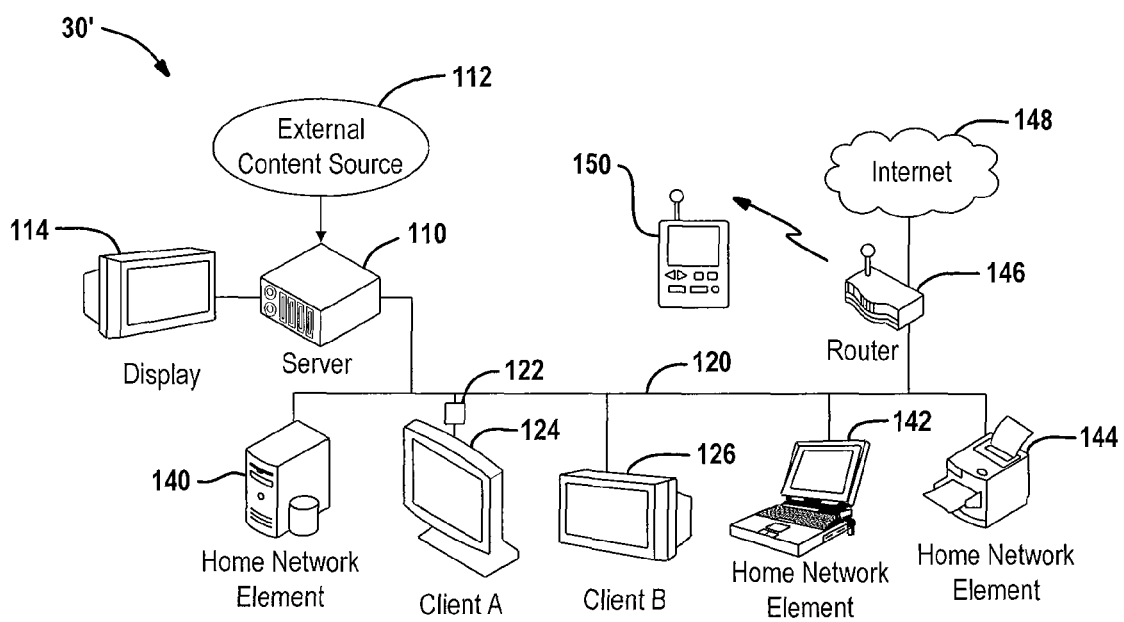
FIG. 3 is a block diagrammatic view of a second example of the network topology.

Referring now to FIG. 3, a fixed user system 30' which is an open network is illustrated. In this example, the same components described above in FIG. 2 are provided with the same reference numerals. In this example, the local area network 120 may include a number of home network elements. One home network element may be a home network server 140 or other computing device. Another home network element may include a laptop computer 142 that is in communication with the local area network 120. Another home network element may include a network printer 144 and a router 146. The router 146 may communicate with other devices through an external network such as the Internet 148.

The fixed user system 30' may also have wireless elements associated therewith. The router 146 or another network device may generate wireless signals that allow a wireless device 150 to communicate with at least one server 110 or 140. The wireless device 150 may, for example, be a personal digital assistant, a cellular phone, a personal media device or a Blu-Ray or DVD player. Of course, other wireless devices may be part of the network.

Figure 4:
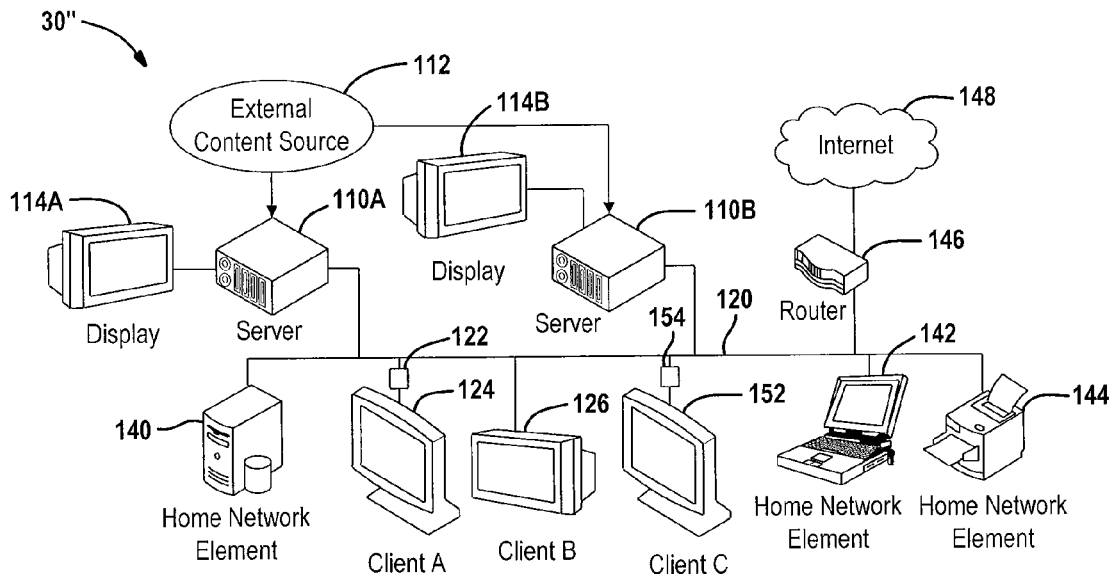
FIG. 4 is a block diagrammatic view of a third example of a network topology.

Referring now to FIG. 4, another example of a fixed user system 30" is illustrated. In this example, the same elements from FIGS. 2 and 3 are provided with the same reference numerals. The local area network 120 may also include two servers 110A and 110B. Each server may include an optional display device 114A, 114B, respectively. In this example, a third client, Client C, is illustrated having a display 152 and a client device 154.

Figure 5:
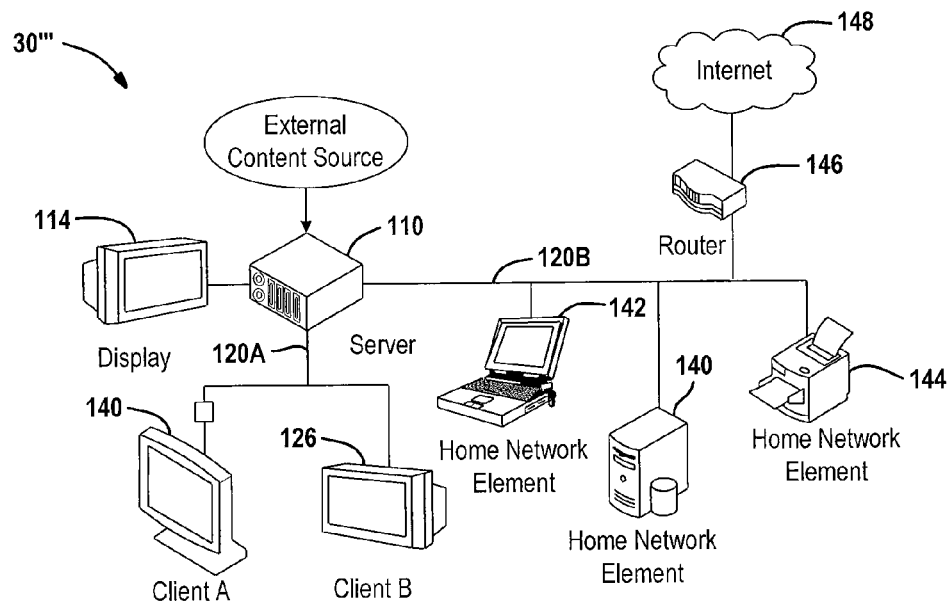
FIG. 5 is a block diagrammatic view of a fourth example of a network topology.

Referring now to FIG. 5, providing customers with reliable service is important. A fourth example of the fixed user system 30''' is illustrated. In certain cases, a home network may not be as reliable as a direct connection. In FIG. 5, the local area network is divided into a first local area network 120A between the first client, Client A, the second client, Client B, and the server 110. That is, the server 110 communicates through the first local area network 120A with both Client A and Client B and any other clients that may be on the system. A second local area network 120B may communicate with other devices within the home network such as the server 140, the laptop computer 142, the printer 144 and the router 146.

Figure 6:
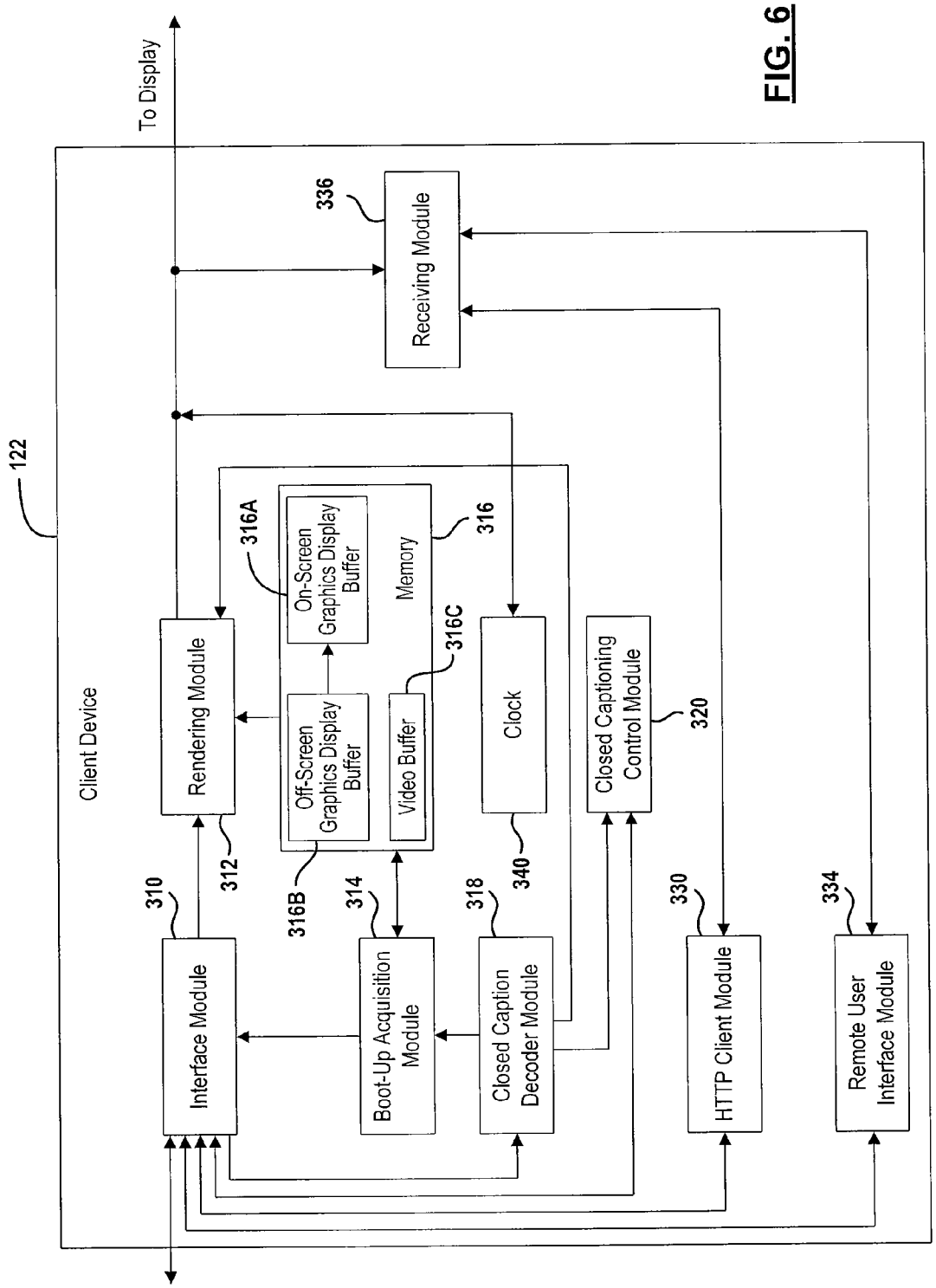
FIG. 6 is a simplified block diagrammatic view of a client device.

Referring now to FIG. 6, a client device 122 is illustrated in further detail. The client device may include various component modules for use within the local area network and for displaying signals. The display of signals may take place by rendering signals provided from the network. It should be noted that the client device 122 may comprise various different types of devices or may be incorporated into various types of devices. For example, the client device 122 may be a standalone device that is used to intercommunicate between a local area network and the server 110 illustrated in FIGS. 2-5. The client device 122 may also be incorporated into various types of devices such as a television, a video gaming system, a hand-held device such as a phone or personal media player, a computer, or any other type of device capable of being networked.

The client device 122 may include various component modules such as those illustrated below. It should be noted that some of the components may be optional components depending on the desired capabilities of the client device and fixed user system. It should also be noted that the client device may equally apply to the mobile user system 40 of FIG. 1.

The client device 122 includes an interface module 310. The interface module 310 may control communication between the local area network and the client device 122. As mentioned above, the client device 122 may be integrated within various types of devices or may be a standalone device. The interface module 310 may include a rendering module 312. The rendering module 312 receives formatted signals through the local area network that are to be displayed on the display. The rendering module 312 merely places pixels in locations as instructed by the formatted signals. By not including a decoder, the rendering module 312 will allow consistent customer experiences at various client devices. The rendering module 312 communicates rendered signals to the display of the device or an external display.

A boot-up acquisition module 314 may provide signals through the interface module 310 during boot-up of the client device 122. The boot-up acquisition module 314 may provide various data that is stored in memory 316 through the interface module 310. The boot-up acquisition module 314 may provide a make identifier, a model identifier, a hardware revision identifier, a major software revision, and a minor software revision identifier. Also, a download location for the server to download a boot image may also be provided. A unique identifier for each device may also be provided. However, the server device is not required to maintain a specific identity of each device. Rather, the non-specific identifiers may be used such as the make, model, etc. described above. The boot-up acquisition module 314 may obtain each of the above-mentioned data from memory 316.

The memory 316 may include various types of memory that are either permanently allocated or temporarily allocated. The on-screen graphics display buffer 316A may be either permanently allocated or temporarily allocated. The on-screen graphics display buffer 316A is used for directly controlling the graphics to the display associated with the client device 122. The on-screen graphics display buffer 316A may have pixels therein that are ultimately communicated to the display associated with the client device.

An off-screen graphics display buffer 316B may be a temporary buffer. The off-screen graphics display buffer 316B may include a plurality of off-screen graphics display buffers. The off-screen graphics display buffer 316B may store the graphics display data prior to communication with the on-screen graphics display buffer 316A. The off-screen graphics display buffer 316B may store more data than that being used by the on-screen graphics display buffer 316A. For example, the off-screen graphics display buffer 316B may include multiple lines of programming guide data that are not currently being displayed through the on-screen graphics display buffer 316A. The off-screen graphics display buffer 316B may have a size that is controlled by the server device as will be described below. The off-screen graphics display buffer 316B may also have a pixel format designated by the server device. The off-screen graphics display buffer may vary in size from, for example, hundreds of bytes to many megabytes such as 16 megabytes. The graphics buffers may be continually allocated and deallocated even within a remote user interface session.

A video buffer memory 316C may also be included within the memory 316. The remote user interface may provide the server with information about, but not limited to, the video capabilities of the client device, the aspect ratio of the client device, the output resolution of the client device and the resolution or position of the buffer in the display.

A closed-caption decoder module 318 may also be included within the client device 122. The closed-caption decoder module 318 may be used to decode closed-captioning signals. The closed-captioning decoder module 318 may also be in communication with rendering module 312 so that the closed-captioning display area may be overlayed upon the rendered signals from the rendering module 312 when displayed upon the display associated with the client device.

The closed-captioning decoder module 318 may be in communication with the closed-captioning control module 320. The closed-captioning control module 320 may control the enablement and disablement of the closed-captioning as well as closed-captioning setup such as font style, position, color and opacity. When a closed-captioning graphical user interface menu is desired, the closed-captioning control module 320 may generate a closed-captioning menu. The closed-captioning control module 320 may receive an input from a user interface such as a push button on the client device or on a remote-control device associated with the client device 122.

The server device may pass control of the display to the client device for the closed-captioning menu to be displayed. The menus may be local and associated with the closed-captioning control module 320. The menus may actually be stored within a memory associated with the closed-captioning control module 320 or within the memory 316 of the client device.

When the server device passes control to the client device 122, the closed-captioning menu will appear on the display associated with the client device 122. Parameters for closed-captioning, including turning on the closed-captioning and turning off the closed-captioning may be performed by the system user. Once the selections are made, the control is passed back from the client device to the server device which maintains the closed-captioning status. The server device may then override the client device 122 when the closed-captioning is turned on and the program type does not correspond to a closed-captioning type. As will be described below, the server device may override the closed-captioning when the closed-captioning is not applicable to a program-type display such as a menu or program guide.

Communications may take place using HTTP client module 330. The HTTP client module 330 may provide formatted HTTP signals to and from the interface module 310.

A remote user interface module 334 allows clients associated with the media server to communicate remote control commands and status to the server. The remote user interface module 334 may be in communication with the receiving module 336. The receiving module 336 may receive the signals from a remote control associated with the display and convert them to a form usable by the remote user interface module 334. The remote user interface module 334 allows the server to send graphics and audio and video to provide a full featured user interface within the client. Thus, the remote user interface module may also receive data through the interface module 310. It should be noted that modules such as the rendering module 312 and the remote user interface module 334 may communicate and render both audio and visual signals.

A clock 340 may communicate with various devices within the system so that the signals and the communications between the server and client are synchronized and controlled.

Figure 7:
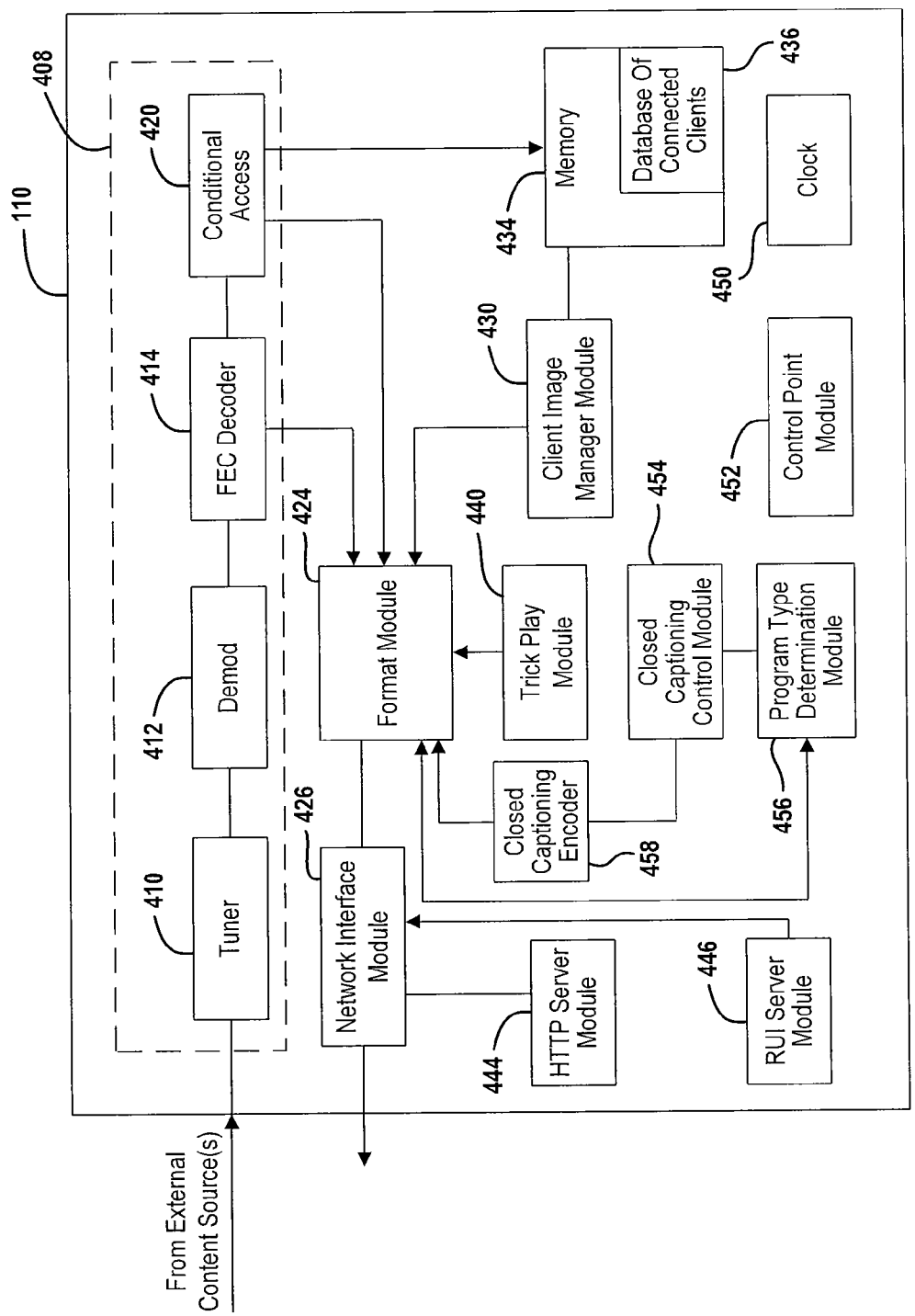
FIG. 7 is a block diagrammatic view of a server device.

Referring now to FIG. 7, a server 110 is illustrated in further detail. The server 110 is used for communicating with various client devices 122. The server 110, as mentioned above, may also be used for communicating directly with a display. The server 110 may be a standalone device or may be provided within another device. For example, the server 110 may be provided within or incorporated with a standard set top box. The server 110 may also be included within a video gaming system, a computer, or other type of workable device. The functional blocks provided below may vary depending on the system and the desired requirements for the system.

The server device 110 may be several different types of devices. The server device 110 may act as a set top box for various types of signals such as satellite signals or cable television signals. The server device 110 may also be part of a video gaming system. Thus, not all of the components are required for the server device set forth below. As mentioned above, the server device 110 may be in communication with various external content sources such as satellite television, cable television, the Internet or other types of data sources. A front end 408 may be provided for processing signals, if required. When in communication with television sources, the front end 408 of the server device may include a tuner 410, a demodulator 412, a forward error correction decoder module 414 and any buffers associated therewith. The front end 408 of the server device 110 may thus be used to tune and demodulate various channels for providing live or recorded television ultimately to the client device 122. A conditional access module 420 may also be provided. The conditional access module 420 may allow the device to properly decode signals and prevent unauthorized reception of the signals.

A format module 424 may be in communication with a network interface module 426. The format module may receive the decoded signals from the decoder 414 or the conditional access module 420, if available, and format the signals so that they may be rendered after transmission through the local area network through the network interface module 426 to the client device. The format module 424 may generate a signal capable of being used as a bitmap or other types of renderable signals. Essentially, the format module 424 may generate commands to control pixels at different locations of the display.

The server device 110 may also be used for other functions including managing the software images for the client. A client image manager module 430 may be used to keep track of the various devices that are attached to the local area network or attached directly to the server device. The client image manager module 430 may keep track of the software major and minor revisions. The client image manager module 430 may be a database of the software images and their status of update.

A memory 434 may also be incorporated into the server device 110. The memory 434 may be various types of memory or a combination of different types of memory. These may include, but are not limited to, a hard drive, flash memory, ROM, RAM, keep-alive memory, and the like.

The memory 434 may contain various data such as the client image manager database described above with respect to the client image manager module 430. The memory may also contain other data such as a database of connected clients 436. The database of connected clients may also include the client image manager module data.

A trick play module 440 may also be included within the server device 110. The trick play module 440 may allow the server device 110 to provide renderable formatted signals from the format module 424 in a format to allow trick play such as rewinding, forwarding, skipping, and the like. An HTTP server module 444 may also be in communication with the network interface module 426. The HTTP server module 444 may allow the server device 110 to communicate with the local area network. Also, the HTTP server module may also allow the server device to communicate with external networks such as the Internet.

A remote user interface (RUI) server module 446 may control the remote user interfaces that are provided from the server device 110 to the client device 122.

A clock 450 may also be incorporated within the server device 110. The clock 450 may be used to time and control the various communications with the various client devices 122.

A control point module 452 may be used to control and supervise the various functions provided above within the server device.

It should be noted that multiple tuners and associated circuitry may be provided. The server device 110 may support multiple client devices 122 within the local area network. Each device is capable of receiving a different channel or data stream. Each client device may be controlled by the server device to receive a different renderable content signal.

A closed-captioning control module 454 may also be disposed within the server device 110. The closed-captioning control module 454 may receive inputs from a program-type determination module 456. The program-type determination module 456 may receive the programming content to be displayed at a client device and determine the type of program or display that the client device will display. The programming-type determination module 456 is illustrated as being in communication with the format module 424. However, the program-type determination module 456 may be in communication with various other modules such as the decoder module 414.

The program-type determination module 456 may make a determination as to the type of programming that is being communicated to the client device 122. The program-type determination module 456 may determine whether the program is a live broadcasted program, a time-delayed or on-demand program, or a content-type that is exempt from using closed-captioning such as a menu or program guide. When the closed-captioning exempt programming is being communicated to the client device 122, a closed-captioning disable signal may be provided to the closed-captioning control module 454 to prevent the closed-captioning from appearing at the display associated with the client device 122. The closed-captioning disable signal may be communicated from the closed-captioning control module 454 through the format module 424 or network interface module 426 to the client device 122. The client device, through the closed-captioning control module 320 illustrated in FIG. 6, may disable the closed-captioning until a non-exempt programming- or content-type or a closed-captioning enable signal is communicated to the client device 122.

The closed-captioning control module 454 may also be in communication with a closed-captioning encoder 458. The closed-captioning encoder 448 may encode the closed-captioning in a format so that the closed-captioning decoder module 318 of FIG. 6 may decode the closed-captioning signal. The closed-captioning encoder module 458 may be optional since a closed-captioning signal may be received from the external source.

Figure 8:
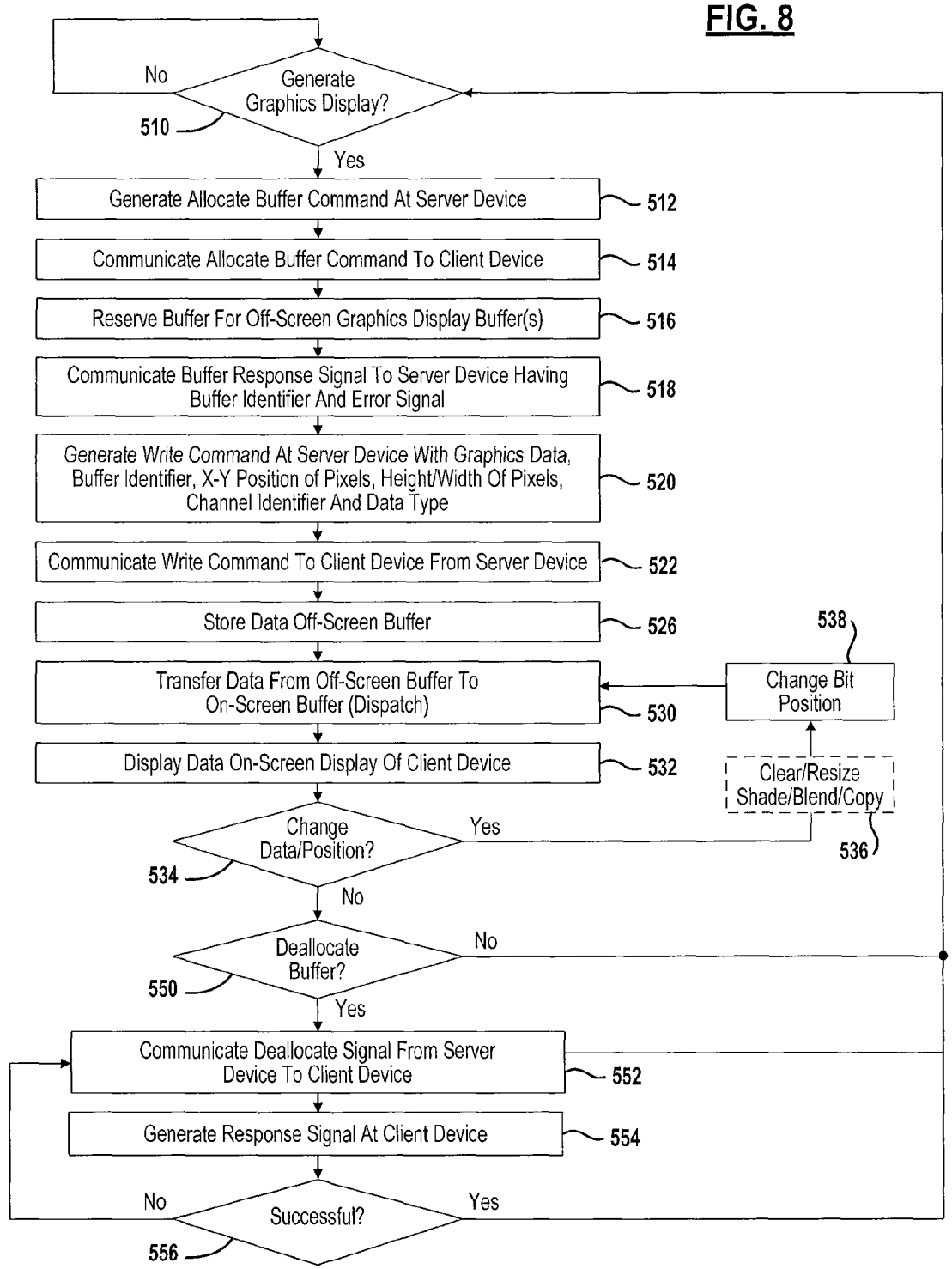
FIG. 8 is a flowchart of a method for displaying data and allocating a buffer corresponding to a display.

Referring now to FIG. 8, a method for displaying graphics data and allocating a buffer associated with a display is set forth. In step 510, it is determined whether or not graphics are to be displayed at the server device. In step 510, if a graphics display is not to be generated, step 510 may again be performed until a graphics display is to be generated. When a graphics display is to be generated in step 510, step 512 generates an allocate buffer command signal at the server device. The allocate buffer command is used to allocate a graphics buffer of a specified dimension and pixel format at the client device. In this example, the allocate buffer command allocates data for an off-screen buffer. The allocate buffer command may include a width of the requested buffer, a height of the requested buffer, a pixel format that corresponds to the desired pixel format of the buffer and a color with which to fill the buffer. The pixel format may include an eight-bit color format color look-up table (CLUT-8) or a 32-bit color format (ARGB-32) which corresponds to alpha, red, green, blue. The color look-up table may map to a 32 bit ARGB. The colors may be pre-multiplied. Within a remote user interface session, the allocate buffer command and deallocate buffer command described below may be performed several times. In step 514, the allocate buffer command is communicated to the client device.

In step 516, the client device reserves the buffer for the off-screen graphics display buffer or buffers. It should be noted that several off-screen buffers may be allocated at any one particular time. The buffer may be reserved by identifying certain memory addresses or address ranges for the off-screen buffer. The size of the off-screen buffer or buffers together may be the size of the on-screen buffer. In step 518, a buffer response signal is communicated to the server device from the client device. A buffer response signal may include a buffer identifier corresponding to an identifier for the buffer reserved in step 516. The buffer identifier may correspond to the address or addresses of the buffer. An error signal that may include an error code may also be provided in the buffer response signal. The buffer response error code signal may correspond to an operation succeeded code, a channel has not been identified code, a buffer could not be created code, or a buffer specified is unknown or not supported code.

In step 520, a write command signal may communicate graphics data to be used ultimately on the screen display of the client device, a buffer identifier, an XY position of pixels, a height/width of pixels, a channel identifier pixel data, compressed pixel data, jpeg pixel data, PWG pixel data, and data type from the server device. In step 522, the write command signal and associated data may be communicated from the server device to the client device. In step 526, data is stored in the off-screen buffer. In step 530, data may be transferred or dispatched from the off-screen buffer to the on-screen buffer. In step 532, the graphics data may be displayed on the screen display associated with the client device from the on-screen buffer.

In step 534, it is determined whether or not it is desired to change the position of the data. If the data may be changed or positioned differently, step 536 may change the position of the data. In step 536, updating the buffer may use bit-blit (block image transfer) commands to clear, resize the buffer or graphics display, shade the screen display copy of the graphics or blend the graphics on the screen display. Step 536 is an optional step. Details of changing the buffer or animating the buffer are described in FIG. 9 below. In step 538, the bit position may also be changed for the display using a bit blit command. For example, when a screen saver is generated, a logo may be moved around the screen. Rather than communicating a new logo each time the logo moves, the off-screen buffer may store the logo and the position of the logo may be changed when communicating the logo to the on-screen buffer without changing the off-screen buffer. This will prevent multiple write command signals from having to be generated at the server device.

Referring back to step 534, if a change in data or the position of the data is not required, step 550 may determine whether or not deallocation of the buffer is desired. If deallocation in the buffer is not desired, step 510 may be performed to wait for further graphics display generation. In step 550, if the buffer is to be deallocated, step 552 communicates a deallocation signal from the server to the client. The deallocation signal may comprise the buffer identifier that is to be released. A deallocation response signal may be generated in step 554 corresponding to whether or not the buffer was successfully deallocated. The error signals associated with the response signal may include a success error code, an invalid state error code or a bad identifier error code. After step 554, it may be determined whether or not the deallocation was successfully performed. If the deallocation was not successfully performed, step 552 may again be performed. In step 556, if a successful allocation was performed, step 510 may again be performed.

Figure 9:
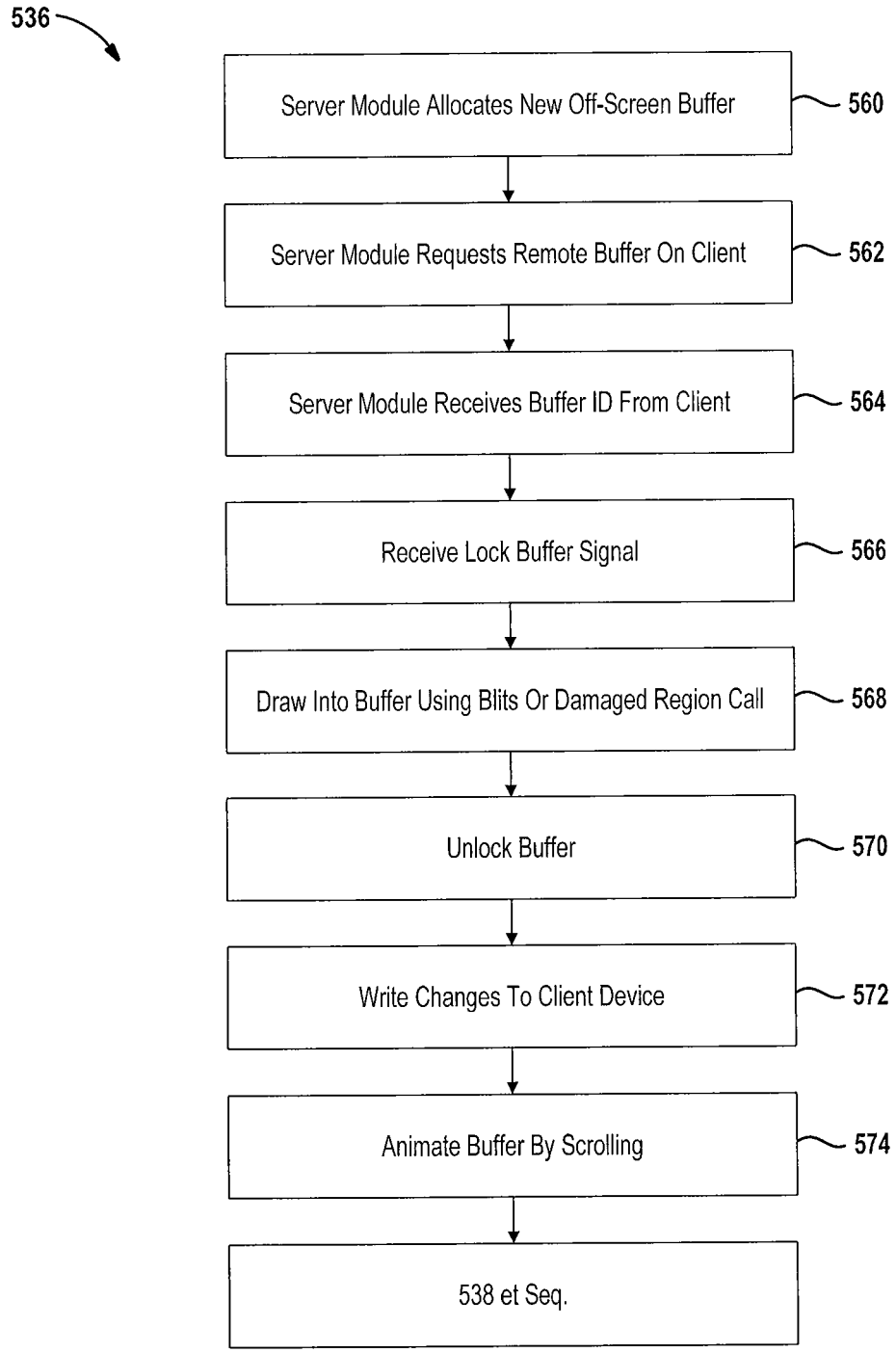
FIG. 9 is a flowchart of a method for animating or moving the buffer.

Referring now to FIG. 9, a method for allocating or changing the position of the buffer is set forth. This figure corresponds to step 536 illustrated in FIG. 8. In step 560, the remote user interface server module receives a signal to allocate a new off-screen buffer. In step 562, the server module 446 requests a remote buffer on the client. In step 564, the server module 446 receives the buffer identifier from the client. In step 566, the server module 446 receives a signal from the server to lock the buffer.

In step 568, the module is signaled with information from the server to draw into the buffer using blits or receives damaged region calls. In step 570, the buffer is unlocked and the remote user interface server module writes the changes to the client device in step 572. In step 574, the buffer is animated by using delta vector commands. The delta vector commands may be in the X or Y direction. After step 574, steps 538 et. seq. are performed. By performing a plurality of blit operations such as locking, filling, copying, unlocking, screen refresh and repeat, the bit map within the buffer appears to scroll on the screen display.

Figure 10:
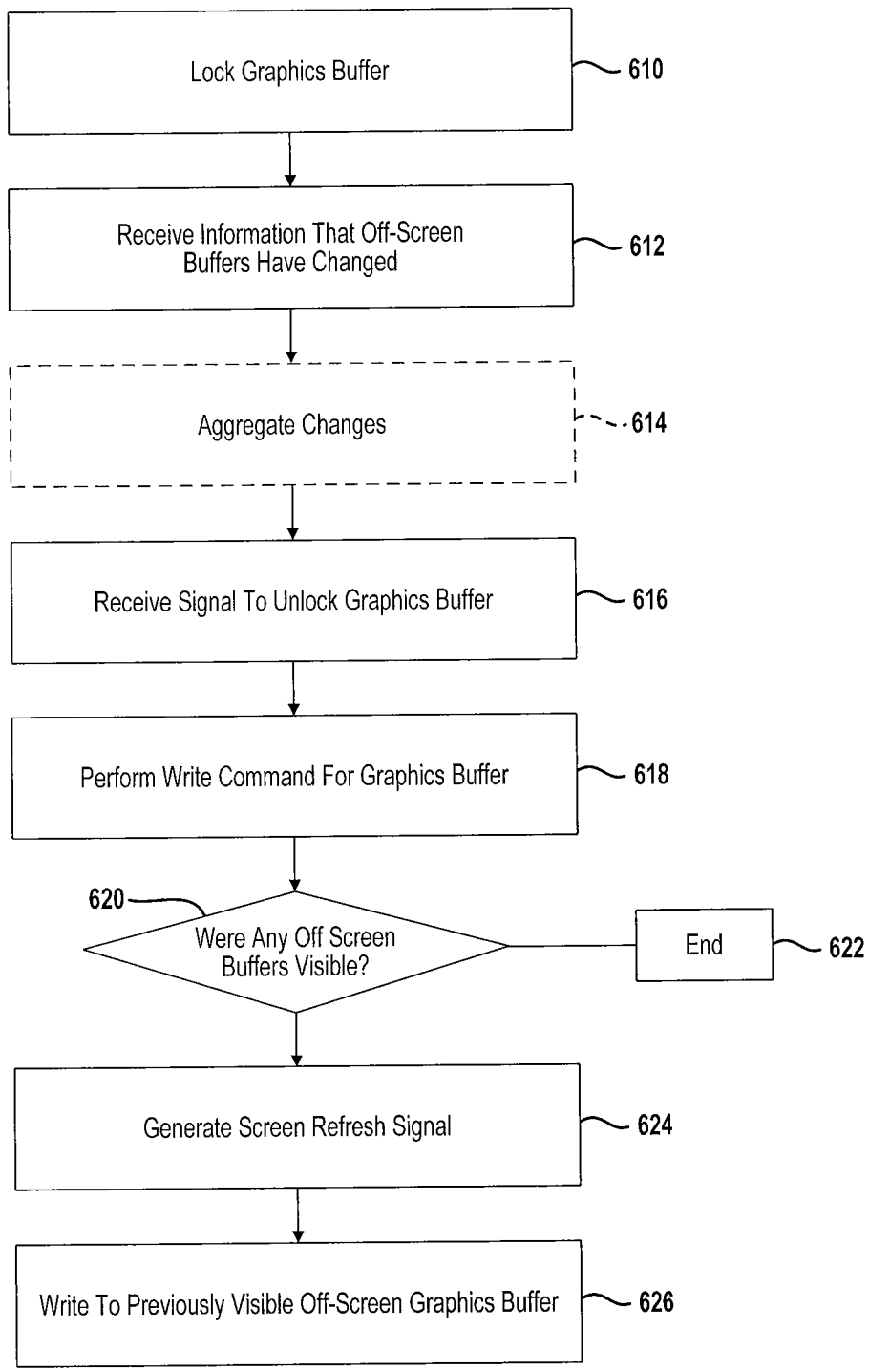
FIG. 10 is a method for updating damaged regions according to the present disclosure.

Referring now to FIG. 10, a method for generating damage region data is set forth. In step 610, the graphics buffer is locked. In step 612, information is received that the off-screen buffers have changed. In step 614, the changes in step 612 may be aggregated to be performed all at once. This may be a configurable operation. In step 616, a signal is received to unlock the graphics buffer. In step 618, a write command is used to write to the graphics buffer. As mentioned above, writing to the graphics buffer may be performed for a plurality of different graphic buffer changes that have been allocated. In step 620, if any of the off-screen buffers were not visible, step 622 ends the process. In step 620, if any of the off-screen buffers were visible, step 624 is performed. In step 624, a screen refresh signal may be generated. In step 626, the previously visible off-screen graphics buffers may be written to initiate a screen refresh.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
communicating an allocate buffer command to a client device from a server device;
reserving an off-screen buffer having a buffer identifier associated therewith;
communicating a buffer response signal comprising the buffer identifier from the client device to the server device;
generating a write command signal at the server device comprising graphics data and the buffer identifier;
communicating the write command signal to the client device;
storing the graphics data in the off-screen buffer;
transferring the graphics data from the off-screen buffer to an on-screen buffer; and
displaying graphics corresponding to the graphics data in the on-screen buffer on a display associated with the client device.

2. The method as recited in claim 1 wherein communicating an allocate buffer command comprises communicating the allocate buffer command through a local area network.

3. The method as recited in claim 1 wherein the buffer response signal further comprises an error signal.

4. The method as recited in claim 3 wherein the error signal corresponds to a successful allocation.

5. The method as recited in claim 3 wherein the error signal corresponds to a buffer creation failure.

6. The method as recited in claim 1 wherein the write command signal further comprises a pixel size.

7. The method as recited in claim 1 wherein the write command signal further comprises a pixel position.

8. The method as recited in claim 1 wherein the write command signal further comprises a channel identifier.

9. The method as recited in claim 1 further comprising changing a graphics characteristic and communicating graphics data from the off-screen buffer to the on-screen buffer according to the graphics characteristic.

10. The method as recited in claim 9 wherein the graphics characteristic comprises at least one of clearing a screen, resizing the graphics, shading the display and blending the display.

11. The method as recited in claim 1 further comprising communicating a buffer deallocation signal from the server device to the client device.

12. The method as recited in claim 1 further comprising generating damaged region data for a plurality of damaged graphics regions, aggregating the damaged region data, and communicating an aggregated damaged region write signal to the client device.

13. A system comprising:
a client device; and
a server device that communicates an allocate buffer command signal to the client device,
wherein said client device reserves an off-screen buffer having a buffer identifier associated therewith and communicates a buffer response signal comprising the buffer identifier to the server device;
wherein the server device communicates a write command signal comprising graphics data and the buffer identifier to the client device; and
wherein said client device stores the graphics data in the off-screen buffer in response to the write command signal, transfers the graphics data from the off-screen buffer to an on-screen buffer and displays graphics corresponding to the graphics data on a display associated with the client device.

14. The system as recited in claim 13 further comprising a local area network communicating the allocate buffer command signal from the server device to the client device.

15. The system as recited in claim 13 wherein the buffer response signal further comprises an error signal.

16. The system as recited in claim 15 wherein the error signal corresponds to a successful allocation.

17. The system as recited in claim 15 wherein the error signal corresponds to a buffer creation failure.

18. The system as recited in claim 13 wherein the write command signal further comprises a pixel size.

19. The system as recited in claim 13 wherein the write command signal further comprises a pixel position.

20. The system as recited in claim 13 wherein the write command signal further comprises a channel identifier.

21. The system as recited in claim 13 wherein the client device changes a graphics characteristic and communicates the graphics data from the off-screen buffer to the on-screen buffer according to the graphics characteristic.

22. The system as recited in claim 21 wherein the graphics characteristic comprises at least one of clearing a screen, resizing the graphics, shading the display and blending the display.

23. The system as recited in claim 13 wherein the server device communicates a buffer deallocation signal to the client device.

24. The system as recited in claim 13 wherein the server device generates damaged region data for a plurality of damaged graphics regions, aggregates the damaged region data, and communicates an aggregated damaged region write signal to the client device.

\* \* \* \* \*